A. BENZINGER.
HOSE OR PIPE COUPLING.
APPLICATION FILED AUG. 18, 1917.
1,257,785. Patented Feb. 26, 1918.
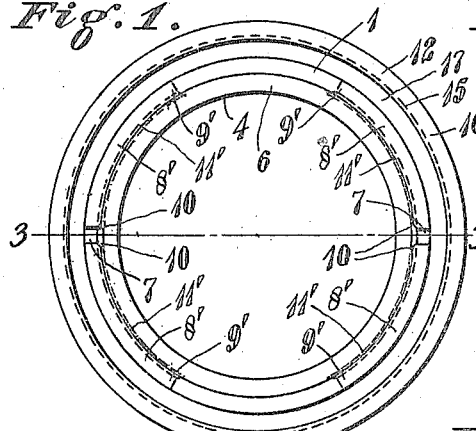
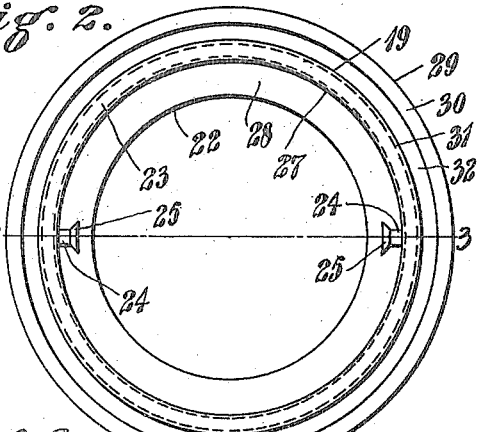
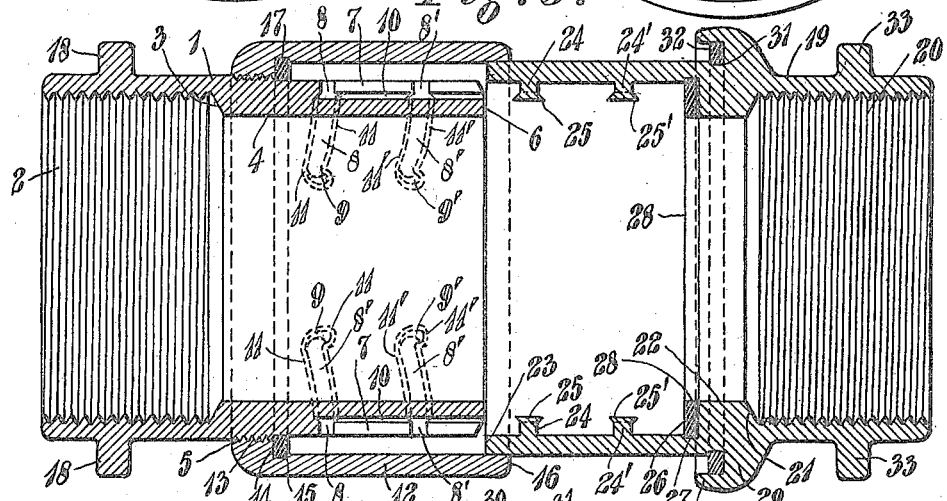
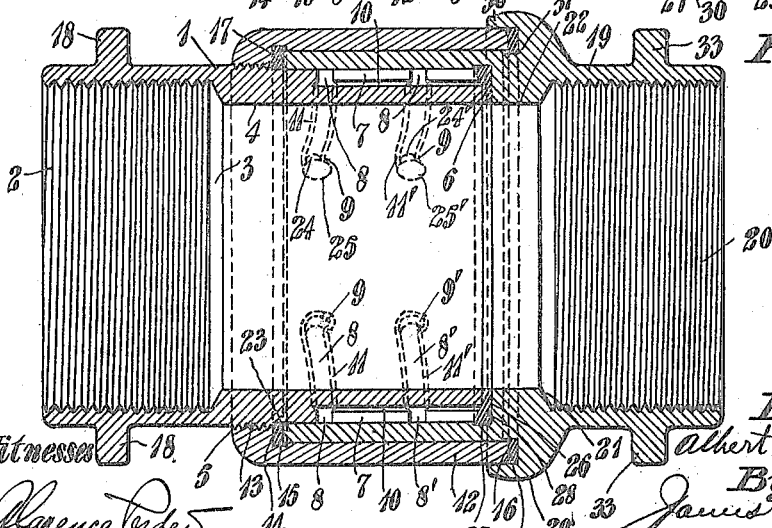

UNITED STATES PATENT OFFICE.

ALBERT BENZINGER, OF CINCINNATI, OHIO, ASSIGNOR OF ONE-THIRD TO WALTER M. SCHOENLE, OF CINCINNATI, OHIO.

HOSE OR PIPE COUPLING.

1,257,785.  Specification of Letters Patent.  Patented Feb. 26, 1918.

Application filed August 18, 1917. Serial No. 186,975.

*To all whom it may concern:*

Be it known that I, ALBERT BENZINGER, a citizen of the United States, and a resident of Cincinnati, in the county of Hamilton and State of Ohio, have invented certain new and useful Improvements in Hose or Pipe Couplings, of which the following is a specification.

My invention relates to hose or pipe couplings, and its object is to provide a coupling which can be readily coupled and uncoupled, and which will amply provide against leakage when coupled, and not have its parts unduly exposed to damage when uncoupled.

My invention consists in the combination of parts and in the details of construction and arrangement of parts as will hereinafter be more fully described and claimed.

In the drawings:

Figure 1 is an end view of the female member;

Fig. 2 is a similar view of the male member;

Fig. 3 is a longitudinal section on a plane corresponding to the lines 3—3 of Figs. 1 and 2, showing the members uncoupled; and Fig. 4 is a similar view showing the member coupled.

The female member 1 of hollow, cylindrical formation has its interior of somewhat greater diameter from its outer end inward for a considerable distance, and this part is provided with threads or corrugations 2, by means of which the member 1 is connected to a pipe or hose in a well-known manner; it being understood that the inner end of the pipe or hose preferably abuts closely against the annular shoulder 3 where this part of greater diameter merges into the inner part 4 of lesser diameter which is left smooth, and preferably of such diameter as to come about flush with the interior surface of the pipe or hose, when connected as above described.

Exteriorly, this female member 1 has, about midway of its length, threads 5 around it. Extending from the inner end 6 of the female member 1 parallel with its axis and preferably diametrically opposite, are straight grooves 7 in the exterior surface of the member 1, which terminate a short distance from the threads 5; and starting around the member 1 in both directions from each groove 7, are branch grooves 8 and 8'. The grooves 8 start from the end of the respective grooves 7, and the grooves 8' start from said grooves 7 a short distance from the inner end 6. These grooves 8 and 8' pass around the member helically like screw threads; it being understood that each two grooves 8 and 8' on the same side of a respective groove 7 are parallel. These grooves may extend any suitable distance around the member 1. As here shown, each groove extends about one-sixth of the way around. The end part of each groove curves slightly back toward the inner end 6, so that each groove 8 or 8' terminates in a pocket 9 or 9'. Also, preferably, the sides of the grooves 7, 8 and 8', and of the pockets 9 and 9' are undercut throughout their lengths adjacent to the bottoms of the grooves, so that lateral ledges 10, 11 and 11' are provided next to the bottoms of the respective grooves.

A thimble 12 of hollow, cylindrical formation is of reduced interior diameter for a short distance inward from its outer end, and in this reduced part is provided with threads 13 to screw on to the threads 5 on the exterior of the female member 1. Where this threaded part terminates inwardly of the thimble and meets the inner part of greater diameter, an annular shoulder 14 is formed, and immediately adjacent to this shoulder 14, the interior of the thimble has a shallow annular groove 15 turned in it, so that immediately adjacent to this shoulder, the interior of the thimble is of slightly greater diameter than the part from this groove 15 to the inner end 16 of the thimble, which part is left smooth. A gasket 17 of rubber or other suitable elastic gasket material fits in the space around the female member 1, against the shoulder 14, and out in the groove 15 of the thimble 12; being held in position by thus extending out into said groove 15. The inner end 6 of the female member 1 is preferably left flat in a plane at right angles to the axis of the member radially inwardly; but radially outwardly in the zone of the grooves 7, where they start in from this end 6, the surface preferably recedes radially outwardly, so that it has a conical formation. The thimble 12 is of such length relative to the part of the female member 1 between its threads 5 and end 6, that when the thimble 12 is attached to the member 1 by means of the threads 5 and 13, the inner end 16 of the thimble 12 will extend for a considerable distance past the inner end 6 of the member 1 all around. It will be understood that the threads 5 and 13 should fit tightly, and may be turned on a slight taper, so that the thimble 12 may be very securely fastened on the exterior of the member 1 in the relation just described. The gasket 17 may be placed in the groove 15 of the thimble 12 before the thimble 12 is applied to the member 1 by passing the threaded end of the thimble in over the inner end of the member 1. The radially outward edges of both ends of the thimble 12 are preferably rounded on ample radii; the end 16 should be left flat in a plane at right angles to the axis.

The outer end part of the member 1 may have radially projecting lugs 18 for grasping it to turn it, or hold it from turning. However, it will be understood that these lugs should not project very far, and equivalent means may be substituted for these; since one of the requirements of a hose coupling is that it shall have no abruptly presented parts to catch on objects across which the hose is being dragged. It is for this reason that the outer end of the thimble 12 preferably has its edge rounded, as shown, and as above alluded to.

The male member 19 of hollow cylindrical formation, has its outer end provided with the internal threads or corrugations 20 and the shoulder 21, where this corrugated or threaded part merges into the inner smooth part 22 of lesser diameter. It will be understood that these parts 20, 21 and 22 of the male member 19 are like the parts 2, 3 and 4, respectively, of the female member 1. The smooth part 22, however, extends only a short distance from the shoulder 21 inwardly; the inner end part of the interior of the male member 19 being of such internal diameter as to slip snugly around the smooth exterior of the inner end part of the female member 1; while exteriorly this inner end part of the male member 19 is smooth and of such diameter as to fit snugly inside the smooth inner end part of the thimble 12. That is to say, when the parts are coupled, this inner end part of the male member 19 fits snugly in the annular space left between the inner end parts of the female member 1 and its thimble 12. The inner end 23 of the male member 19 is left flat at right angles to the axis of the member to seat snugly against the face of the gasket 17 where it is exposed in this annular space.

Projecting inwardly from the interior surface of this inner end part of the male member 19, are buttons or studs 24 and 24', respectively, remote from and nearer to the inner end of the member 19, and, preferably, in diametrically opposite pairs, or disposed in accordance with the disposition of the grooves 7 around the female member 1; and those of each pair being on a line parallel with the axis of the member. The inner end of each stud 24 or 24' is provided with a radially extending annular flange 25 or 25', respectively, so that each stud is substantially of the shape of a short rivet with a flat head. As shown in the drawing, these studs are integral with the member 19; but it will be understood that they may be made separately and secured therein in any suitable well-known manner. The important requirement in the shaping and location of these studs 24 and 24' is that the pairs will enter the respective grooves 7 in the female member 1 as the inner part of the male member 19 enters the annular space between the female member 1 and its thimble 12, and when the inner end 23 has abutted the gasket 17, these studs 25 and 25' will be opposite the branch grooves 8 and 8', respectively. Then when the members 1 and 19 are rotated relative to each other in either direction, the studs will enter the respective branch grooves, and in following these grooves, the members 1 and 19, will be drawn more closely together, compressing the gasket 17. Then when the studs reach the ends of the respective grooves and may move back into the respective pockets 9 and 9', the elastic gasket 17 will force the members 1 and 19 slightly apart again and hold the studs in the pockets; thus locking the members together until such pressure is applied to them externally as to again compress the gasket 17 to the extent that would permit the studs to leave the pockets and pass out again along the branch grooves to the longitudinal grooves 7 therealong entirely to released position.

Where the part 22 terminates inwardly, a shoulder 26 is formed in the male member 19 facing toward the inner end 6 of the female member 1. This shoulder is made flat in a plane at right angles to the axis of the member, and immediately adjacent to it a shallow annular groove 27 is formed in the interior of the member 19. An annular gasket 28 of rubber or other suitable elastic gasket material, is held against this shoulder 26 by fitting out in this groove 27 in the same manner as the gasket 17 is held in the thimble 12 against the shoulder 14.

On the exterior of the male member 19 is an outwardly extending annular flange 29 with a face presented toward the inner end 16 of the thimble 12, and preferably having an axially extending annular bead 30 entirely around this face. Immediately adjacent to this face, the exterior of the member 19 has formed in it a shallow annular groove 31. The face is preferably made flat in a plane at right angles to the axis of the member 19, and a gasket 32 of rubber or other suitable elastic gasket material is fitted against this face inside the bead 30 and extending into the groove 31, so that it is securely held in place and protected from injury or displacement in the handling of the hose or pipe on which the coupling is mounted.

The shoulder 26 interiorly and the flange 29 exteriorly of the member 19 with their abutting gaskets 28 and 32, respectively, are so located relative to the inner end 23 of the member 19, that when said end 23 abuts the gasket 17 in the female member 1, the ends 6 and 16 of the member 1 and thimble 12, respectively, will abut the gaskets 28 and 32. Thus, these gaskets will be compressed simultaneously with the compression of the gasket 17 as the studs travel along the branch grooves, and these gaskets 28 and 32 will act in conjunction with the gasket 17 due to their elasticity to force the studs into the pockets 9 and 9'; and will have to be compressed slightly again along with the gasket 17 in releasing the studs from the pockets.

The exterior of the internally threaded or corrugated part of the member 19 is also preferably provided with radial lugs 33 like the lugs 18 on the female member 1. It will be understood that these lugs 33 may have substituted for them equivalent well-known means for facilitating turning of the member 19; and where used, should be of moderate projection; while the exterior surface of the flange 29 is of cross-section exteriorly rounded on ample radii. Such smooth exterior formation of the male member 19 is for the same purpose as that alluded to in describing the female member 1.

In bringing the members together, the inner end of the male member 19 first brings its smooth exterior inside the smooth interior of the thimble 12 and is then guided to pass over the exterior of the female member 1 some distance inward, as above described. When the first studs 25' engage with the ends 6 of the member 1, the members 1 and 19 may be turned relatively until these studs coincide with the ends of the grooves 7. Then the members may be pushed together until the studs 25' reach the ends of the grooves 7; whereupon the members may be relatively turned in either direction to effect the successive wedging and locking operation above described. It will be understood that the pockets 9 and 9' do not extend in as far as to coincide with the entrances of the respective branch grooves which they terminate. Thus, the gaskets 17, 28 and 32 are only partially expanded again in forcing the studs into the pockets, so that they are thereby able to maintain the locked condition, as well as to form effective fluid tight contacts with the respective seats 23, 6 and 16 on the ends of the member 19, thimble 12 and member 1, respectively.

Moreover, when the members are uncoupled and being dragged over various objects in the handling of the hose or pipe to which they are connected, the projecting end part of the thimble 12 will protect the end 6 of the member 1 against deformation; while the gasket 28 on which this end 6 is to seat will be far inside the member 19 where it will not be readily damaged.

Likewise, the grooves 7, 8 and 8' are far inside the thimble 12 and protected thereby while the studs 25 and 25' are both well inside the member 19 where they are not readily damaged.

The ends 16 and 23 of the members 1 and 19, respectively, are, of course, exposed when the parts are uncoupled, and liable to be deformed in striking against hard objects over which the couplings are dragged; although their respective gaskets 17 and 32 are well protected from displacement or injury. Thus, the ends 16 and 23 may have been damaged so as to have their accuracy of fitting against their gaskets somewhat impaired; but the main connection of the end 6 with the gasket 28, which is the first one the fluid must pass if leakage is to occur, may be depended upon to always be in fair condition; and the connection between the end 23 and gasket 17, and the end 16 and gasket 32, succeeding in series, will so add to the hindrance of passage of any possible leakage past the inner connection that the coupling as a whole will be very effective against leakage, even after a long period of use, and having been subjected to severe handling.

The tightness with which the members are locked together is augmented, as above set forth, by the parallel expansive action of all of the gaskets 17, 28 and 32 holding the studs in the pockets. This tightness and security of locking is further increased by having the flanges 25 and 25' of such proportion to the undercutting in the grooves and pockets, that the flanges will fit under the ledges 11 and 11' in the pockets with a considerable degree of friction. For best subserving this purpose, it is preferred that the meeting sides of the flanges and ledges be inclined at an angle of about forty-five degrees, as indicated in the drawing. It will be understood that the diameter of these studs and their flanges may be such relative to the width of the grooves 7, and parts of the grooves 8 and 8' that approach the pockets 9 and 9', that the studs will travel freely along the grooves; the wedging effect taking place when the studs are forced back into the pockets, and between the contacting flanges and ledges adjacent to the ends of the pockets nearest to the inner end of the member 1. This will produce the desired wedging effect to add the frictional to the expansive holding action; and yet when the gaskets have been again compressed, the studs will readily leave the pockets and travel along the grooves to released position, as the parts are relatively turned and then longitudinally drawn apart in the manner hereinbefore described.

Having fully described my invention, what I claim as new and desire to secure by Letters Patent is:

1. In a hose or pipe coupling, a member, an interiorly located elastic gasket on said member, a mating member having an interiorly located seat to abut said gasket when the members are coupled, this member having an interiorly located groove extending helically away from said seat, and terminating in a pocket extending part of the way back toward said seat, said pocket being undercut next to its bottom to form a ledge, and the first-mentioned member having an interiorly located stud to enter said pocket along said groove, said stud having a flange to wedge under said ledge, and said gasket being compressed under the pressure of said seat as said stud travels along said groove to said pocket and then partially expanding again to hold said stud in said pocket with its flange wedged under said ledge, and thereby lock said members together.

2. In a hose coupling, a female member with an inner end forming a seat, and having formed in its exterior a groove extending helically away from said seat and terminating in a pocket that extends partially back toward said seat, a thimble fixed on the exterior of said female member with an inner end part spaced away from the grooved exterior of the member, leaving an annular space entirely therearound, and this inner end part extending a considerable distance past the inner end that forms the seat on said member to form a guide toward and a guard for said seat, a male member adapted to fit inside said annular space, an inwardly extending lug on the inside of said male member interiorly thereof adapted to enter said groove and travel therealong into said pocket as said members are relatively rotated, a gasket of elastic material held inside said male member which said end of said female member compresses when said stud travels along said groove, and which partially expands again when said stud enters said pocket, whereby said parts are locked together, a second elastic gasket held axially against said thimble inside its annular space, and compressed by the entering end of said male member, an annular extension around the exterior of said male member, and a third gasket held axially against this extension and compressed by the end of said thimble, said gaskets being compressed and partially expanding in parallel with the compression and partial expansion of the first-mentioned gasket, and thereby acting in parallel in maintaining the locked condition, and being in series in hindering leakage during said condition.

ALBERT BENZINGER.

Witnesses:
JAMES N. RAMSEY,
CLARENCE PERDEW.

Copies of this patent may be obtained for five cents each, by addressing the "Commissioner of Patents, Washington, D. C."